INVENTORS:
Willi Martin Johannes Rückert
Wilhelm Maciejewski

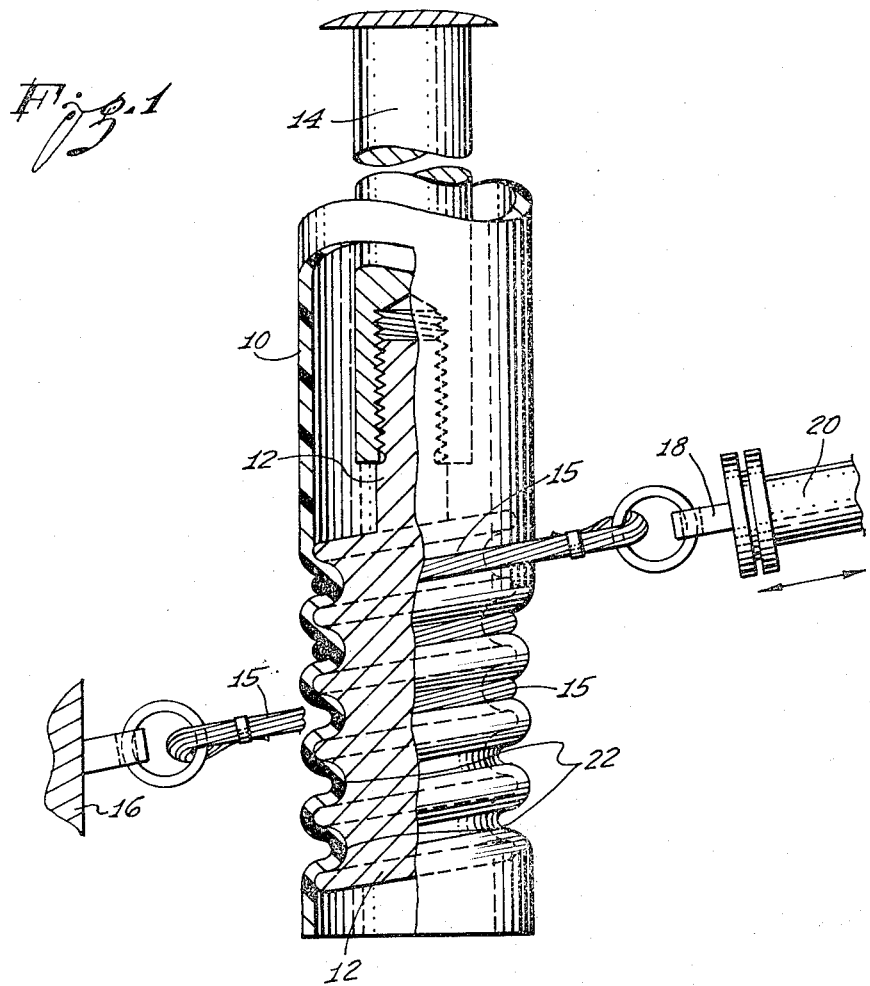

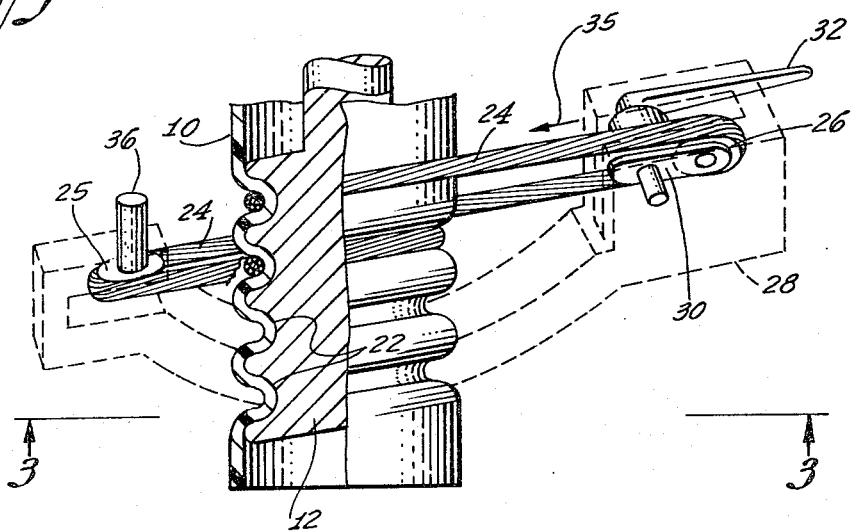
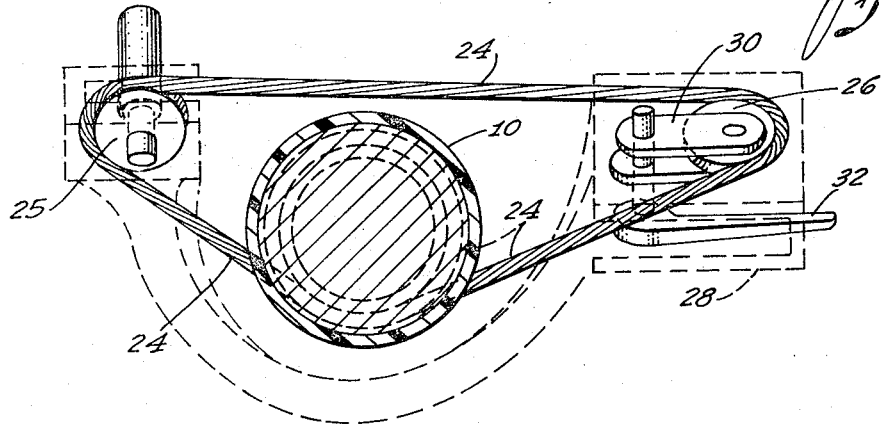

Attorneys

United States Patent Office 3,327,039
Patented June 20, 1967

3,327,039
METHOD OF FABRICATING SPIRAL HOSE
Willi Martin Johannes Rückert and Wilhelm Maciejewski, Hamburg-Wilhelmsburg, Germany, assignors to W. S. Shamban & Company, Culver City, Calif., a corporation of California
Filed June 12, 1963, Ser. No. 287,303
14 Claims. (Cl. 264—313)

This invention relates to a method of producing spirally corrugated hose fabricated of plastic material. Such a hose is utilized where flexibility and elasticity are required in a hose having a relatively thick wall. Thus, the invention offers an alternative to bellows-shaped tubing.

Various attempts have been made heretofore to produce spirally corrugated hose from plastics, but numerous difficulties have been met, especially in attempts to fabricate such hose from tetrafluoethylene (TFE). Some of these attempts have involved machining of the plastic material. Other attempts have avoided machining operations by forcing a threaded mandrel of progressively increasing diameter through a tube or, alternatively, by forcing the hose through a nut. These last mentioned attempts have failed because of the high degree of friction involved.

There have also been attempts to produce spirally corrugated hose from plastic tube by placing a plain tube in a heated mold having a spirally grooved cavity and then applying pressure to the interior of the tube to expand the tube into the mold configuration. Such a method, however, is laborious and expensive to carry out and, in addition, requires costly molds.

The new method is extremely simple in comparison with the above examples. It is characterized by the fact that the spiral hose is produced from a conventional tube by squeezing the wall of the tube with internal and external groove forming members. It is advantageous to carry out the spiral shaping progressively.

In carrying out one practice of the invention, a mandrel of the character of a threaded bolt with an external diameter corresponding to the interior diameter of the tube is introduced into the tube; and in order to produce the spiral grooves in the tube, an elongated flexible member such as suitable string, rope, or wire is wound spirally round the circumference of the tube and tightened to coincide with the spiral grooves of the mandrel.

The method is executed very simply and gradually. The rope can, for instance, be wound around the tube in three coils and then tightened so hard that it sinks into the corresponding grooves of the mandrel, previously placed inside the tube. The rope is then loosened, the tube is either pushed forward about three more spirals or is screwed along the mandrel the same distance, and then the process is repeated.

It is possible, however, to process the tube continuously. One end of the tube to be processed is initially shaped into one or two spirals by means of a taut rope in cooperation with the mandrel, and then the tube is moved forward progressively with the rope taut to form further spirals.

The taut shaping rope may be used to cause the progressive feed by turning the tube on its axis by means of a one-sided pull. For this purpose, the mandrel can be firmly fixed. The mandrel only needs to be grooved over the section where shaping actually takes place. Because the mandrel screw-threadedly engages the already formed spiral corrugations of the tube, the rotation of the tube by the rope causes the tube to advance axially.

A threaded mandrel, however, can also be supplied which moves forward with the tube, with no relative motion between the mandrel and the tube. The mandrel must then be screwed out of the tube on completion of the process.

The invention teaches that the shaping may take place in several stages, following one after another, until the required depth of the grooves is achieved; i.e., to begin, with, the spiral grooves may be only slightly formed into the tube by the rope, and then the tube may be squeezed progressively to the full depth of the grooves in succeeding operations. This process is carried out by moving the tube several times over the same apparatus, with the rope gradually drawn tighter in the course of the procedure. The same effect can also be achieved by arranging several separate pressing stages to follow one after another.

In order to prevent any marking of the tube surface by the rope, it is advisable to insure that the rope surface is smooth. For example, wire can be coated with a smooth synthetic material such as Teflon.

A further way of applying the method is to use pressure rollers. For this purpose, the tube may be supported on the inside by a threaded mandrel, as described above, or alternatively the tube may be supported on the inside by pressure rollers. In this latter procedure, the tube is processed in such a way that its orignal diameter is reduced by the production of the spirals, and in addition the tube is also shaped from the inside. On the other hand, if the tube is shaped on a mandrel, the outermost parts of the grooves of the tube remain unstretched. When a tube is shaped by inner and outer rollers, both the inside and outside diameters of the tube are stretched. Thus, the greatest amount of pull can be reduced by half in the last instance.

Normally, the process takes place without heating the tube, but for some materials, and when the tube must be severely stretched, it is advisable to proceed at a higher temperature.

The invention may be understood from the following detailed description and the accompanying drawings.

In the drawings, which are to be regarded as merely illustrative:

FIG. 1 is a view partly in elevation and partly in section illustrating a first practice of the invention, which is carried out by means of a rope or the like in cooperation with a spirally grooved mandrel;

FIG. 2 is a similar view illustrating a second practice of the invention, in which rollers cooperate with the rope;

FIG. 3 is a plan view of the rope and pulley arrangement of FIG. 2;

Figure 4:
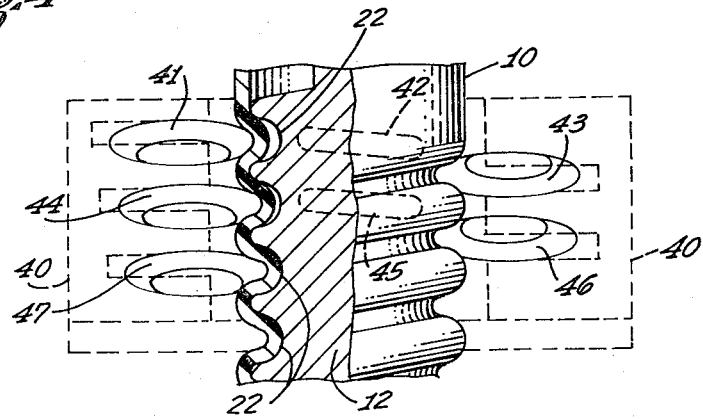
FIG. 4 is a view similar to FIGS. 1 and 2 illustrating a third practice of the invention which involves the use of a spirally grooved mandrel inside the tube and the use of roller means outside the tube.

In FIG. 1, illustrating the first practice of the invention, the desired spirally corrugated hose is fabricated from a piece of tube 10 of hard synthetic thermoplastic material, in this instance, tetrafluoethylene (TFE), which material may be heated for the purpose of the foaming operation if desired. A mandrel 12 of the general configuration of a threaded bolt is mounted on the end of a fixedly supported rod 14. The mandrel may be threaded onto the end of the rod for convenient removal when desired. An elongated flexible member in the form of a rope 15 is anchored at one end to fixed structure 16 in the manner shown, and the other end of the rope is attached to a piston rod 18 that extends from a power cylinder 20, which power cylinder may be either pneumatically or hydraulically actuated. The power cylinder serves as means to stretch the rope 15 in a controlled manner, but other devices may be used for the same purpose, including manually operable devices incorporating levers.

With the mandrel 12 positioned inside the plain tube 10 in the manner shown in FIG. 1, the rope 15 is tightened by the power cylinder 20 to cause the rope to force the wall of the tube 10 into the spiral groove 22 of the mandrel. When the portion of the tube 10 corresponding to the effective length of the rope 15 is shaped to the desired configuration in this manner, the rope is loosened and the tube is advanced, for example, advanced by 1½ grooves for repetition of the operation. Thus, each operation may form 1½ turns of the desired spiral groove in the tube 10. This method of forming the tube is the preferred method for small production runs and for runs where there is variation in the length, diameter, wall thickness, and pitch of the spirally corrugated tube.

Where a continuous process is required, an apparatus may be employed of the general character shown in FIGS. 2 and 3. The same fixedly supported mandrel 12 is employed inside the tube 10. A rope 24 is used on the exterior of the tube, but in this instance the rope is formed into an endless loop engaged from the inside by two rollers 25 and 26, with one leg of the loop making a single turn around the tube 10. The two rollers 25 and 26 may be mounted on annular support structure 28, shown in phantom, which surrounds the tubes 10.

The pulley 26 is journaled on an eccentric 30, which may be rotated up to 180 degrees by a lever 32 to tighten the rope loop.

The provision of the roller 26, subject to adjustment by the eccentric 30, makes it possible to adjust the depth to which the rope 24 presses the wall of the tube 10 into the spiral groove 22 of the mandrel.

First, the tube is pushed forward over the mandrel 12 so that the point at which the spiral forming of the tube is to begin coincides with a turn of the mandrel groove 22, and then the mechanism is set in motion. At first the rope must be slack, but subsequently the rope is tightened by rotation of the eccentric 30. The tightening of the rope must be slack, but subsequently the rope is tightened groove 22 to produce the first portion of the spiral corrugation in the tube.

The tube is then turned progressively in the direction of the circular arrow 34 with the consequent travel of the rope in the direction indicated by the arrow 35. In this manner, the tube progresses spirally downward, as viewed in FIG. 2, with the taut rope 24 progressively forming the spiral corrugation. If desired, instead of feeding the tube 10 longitudinally to the mandrel 12 by rotation of the tube, the same progressive action may be achieved by power actuating the shaft 36 on which the roller 25 is mounted. The rope 24 then serves not only as means to form the spiral corrugation in the tube, but also as means to cause rotation of the tube for progressive feeding of the tube into the processing zone.

Both of the two described procedures for utilizing the apparatus shown in FIGS. 2 and 3 involve friction between the tube and the grooved mandrel. If such friction becomes a problem, the grooved mandrel 12 may be lengthened to occupy the full length of the initial piece of tube. The full-length mandrel is mounted in a freely rotatable manner and, therefore, rotates with the tube with no friction whatsoever between the tube and the mandrel. After such a fabrication operation is completed, the long mandrel is unscrewed from the finished tube.

In the third practice of the invention, illustrated by FIG. 4, a fixedly supported mandrel 12 is employed, and roller means instead of rope means is used on the exterior of the tube into the spiral groove 22 of the mandrel. sets of rollers are mounted on a fixed exterior support structure indicated diagrammatically in phantom at 40, which surrounds the mandrel 12. In this instance, there are four sets of rollers being omitted for clarity of illustration.

Roller 41 of the first set of rollers makes initial contact with the tube 10 and only slightly depresses the wall of the tube into the spiral groove 22 of the mandrel. Roller 42 of the second set of rollers and roller 43 of the third set of rollers follow the spiral track of the first roller 41, and each operates to increase the indenture of the tube wall. A fourth roller (not shown) of the fourth set and the second roller 44 of the first set follow in the track of roller 43 and further progressively indent the wall of the tube, the degree of indenture by the roller 44 at this point being shown in the drawing. It is to be noted that the tube wall is not depressed completely against the bottom of the spiral groove 22. The second roller 45 of the second set, the second roller 46 of the third set, and a second roller (not shown) of the fourth set continue along the same track for further indenture of the tube wall, until finally the third roller 47 of the first set completely bottoms the tube wall in the spiral groove 22.

The tube 10 may be rotated to feed the tube to the sets of rollers, or the rollers may be power driven to rotate the tube and thereby feed the tube to the processing zone. It is to be noted that all of the rollers are slightly tilted and that the rollers are arranged symmetrically around the circumference of the tube so that the pressure of the rollers is distributed around the circumference. If it is desired, the mandrel 12 may be extended in length to the full length of the tube to rotate with the tube and thus avoid friction between the tube and the mandrel.

Figure 5:
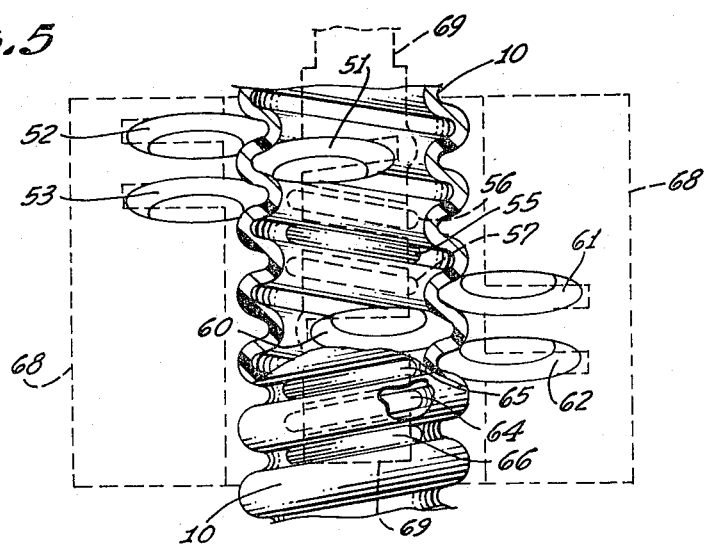
FIG. 5 is a longitudinal sectional view of a tube in the process of fabrication, showing how roller means may be employed both inside and outside the tube for the shaping operation.

In the practice of the invention illustrated by FIG. 5, roller means are employed both inside and outside of the tube 10. In the particular construction shown, there are four sets of three rollers each, arranged at equal circumferential spacing. The first set comprises an inside roller 51 and two cooperating outside rollers 52 and 53. The second set comprises an inside roller 55 and two cooperating outside rollers 56 and 57. The third set comprises an inside roller 60 and two cooperating outside rollers 61 and 62. The fourth set comprises an inside roller 64 and two cooperating outside rollers 65 and 66. These four sets of rollers are preferably arranged to cooperate for progressively forming the spiral corrugation, the final depth of the corrugation being achieved by the fourth set of rollers. The various outside rollers 52, 53, 56, 57, 61, 62, 65, and 66 are mounted on external support structure indicated diagrammatically in phantom at 68; and the four inside rollers 51, 55, 60, and 64 are mounted on an inner support structure indicated in phantom at 69, this inner support structure being of the general configuration of a crankshaft. The tube may be rotated for axial progress through the processing zone, and at least some of the various rollers may be power actuated for this purpose.

Figure 6:
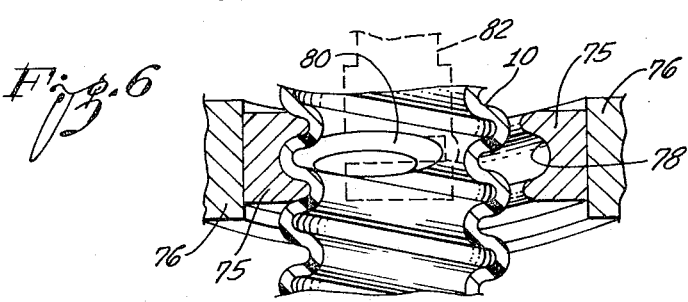
FIG. 6 is a similar view, in which an annular forming means with an internal spiral groove is used on the outside of the tube, and cooperative roller means is employed inside the tube.

In FIG. 6, the forming apparatus includes an outer ring 75, which is mounted on fixed support structure 76 and which is oversized relative to the initial outside diameter of the tube 10. The outer ring 75 is formed with an inner spiral groove 78 of the configuration of the desired spiral corrugation. Cooperative with the outer ring 75 is an inner roller 80 mounted on inner support structure 82 (shown in phantom). The tube 10 is caused to rotate whereby the tube is axially fed to the processing zone by engagement of the tube between the outer ring 75 and the inner roller 80. For this purpose, the inner roller 80 may be power actuated to facilitate the desired rotation of the tube 10.

In the construction shown, the single roller 80 cooperating with the outer fixed ring 75 suffices to carry out the complete forming operation, and for this purpose the roller 80 firmly presses the wall of the tube 10 into the spiral groove 78 of the fixed structure 76. If desired, the groove 78 may be extended several turns, and additional rollers 80 may be employed to cooperate with one side of the ring, the successive rollers progressively indenting the wall of the tube into the groove 78.

Our description in specific detail of the selected practices of the invention will suggest various changes, substitutions, and other departures from our disclosure within the spirit and scope of the appended claims.

We claim:
1. In a method of fabricating a spirally corrugated hose from a preformed tube having a deformable wall that is generally longitudinally smooth, the steps of:
   positioning an inner groove-forming member within the tube;
   providing support means having an external groove-forming member secured thereto externally of the tube;
   forcing said groove-forming members toward each other to forcibly engage the wall of the tube to form a spiral groove inside the tube and a spiral groove outside the tube offset from the inside groove; and
   moving the tube longitudinally relative to the external groove-forming member to progressively convert the tube into the corrugated hose.

2. In a method of fabricating a corrugated hose from a tube having a wall of deformable material, the steps of:
   inserting an inner groove-forming member into the tube;
   providing an elongated flexible member secured to support means;
   forcing said elongated flexible member against the tube to urge a portion of the wall of the tube against said inner groove-forming means to corrugate the tube; and
   moving the tube longitudinally relative to the elongated flexible member to progressively convert the tube into the corrugated hose.

3. In a method of fabricating a spirally corrugated hose from a tube of deformable material, the steps of:
   inserting a spirally grooved mandrel into the tube;
   providing an elongated flexible member secured to support means, said elongated flexible member extending completely around the tube;
   tightening the elongated flexible member to urge a portion of the wall of the tube against the mandrel to form a first section of a spiral groove;
   losening the elongated flexible member;
   advancing the tube longitudinally relative to the elongated flexible member; and
   tightening the elongated flexible member a second time to urge another portion of the wall of the tube against the mandrel to form a second section of a spiral groove continuous with said first section.

4. In a method of fabricating a corrugated hose from a preformed tube having a wall of deformable material, the steps of:
   continuously deforming the wall of the tube between an external groove-forming member and an internal groove-forming member to form a spiral groove inside the tube and a spiral groove outside the tube offset from the groove inside the tube while rotating at least one of said tube, said internal groove-forming member and said external groove-forming member to thereby move the tube longitudinally of the external groove-forming member to continuously and progressively form said grooves along the length of the tube without causing either of said members to become a portion of said tube.

5. A method as set forth in claim 4 in which said internal groove-forming member includes a spirally grooved mandrel inside the tube and said external groove-forming member includes an elongated flexible member positioned exteriorly of the tube and said step of deforming includes tightening of said elongated flexible member.

6. A method as set forth in claim 1 wherein said internal groove-forming member includes a spirally grooved mandrel inside the tube and said external groove-forming member includes roller means and said step of moving occurs continuously.

7. A method as defined in claim 1 in which said external groove-forming member includes first roller means positioned outside of the tube and said internal groove-forming member includes second roller means positioned inside of the tube and longitudinally offset from said first roller means and said step of moving includes rotating at least one of said roller means and said tube.

8. A method as defined in claim 1 in which said external groove-forming member includes an annular member having a spirally grooved inner surface and said internal groove-forming member includes roller means inside of the tube.

9. In an apparatus for transforming a tube having a deformable wall with interior and exterior wall surfaces into a corrugated hose, the combination of:
   a substantially rigid internal groove-forming member positionable within the tube and engageable with the interior wall surface thereof;
   first mounting means for mounting said internal groove-forming member within the tube;
   a cooperating external flexible member positionable exteriorly of the tube and engageable with the exterior wall surface thereof;
   an external supporting structure at least partially defining a work station;
   second mounting means for mounting said flexible member on said external supporting structure at said work station, said external supporting structure retaining said flexible member at said work station;
   means for tightening said flexible member to force the wall of the tube tightly against the internal groove-forming member to offset the portion of the wall of the tube at said work station to form a groove; and
   means for moving the tube longitudinally through said work station to progressively allow said flexible member and said internal groove-forming member to form the groove in the tube.

10. In an apparatus for transforming a tube having a wall with interior and exterior wall surfaces into a spirally corrugated hose, the combination of:
    roller means positionable within the tube and engageable with the interior wall surface thereof;
    first mounting means for mounting said roller means within the tube;
    a cooperating outer ring surrounding the tube and having an inner spiral groove in substantial radial alignment with said roller means;
    an external supporting structure at least partially defining a work station;
    second mounting means for mounting said ring on said external supporting structure at said work station, said external supporting structure retaining said ring at said work station; and
    means for rotating the tube to move the tube longitudinally through said work station to allow said roller means and said inner spiral groove of said ring to deform the tube and form the spirally corrugated hose.

11. An apparatus for transforming a plain plastic tube into a spirally corrugated hose, comprising:
    a spirally grooved mandrel for positioning inside the tube;
    an elongated flexible member for winding around the tube in register with the spiral grooving of the mandrel, said flexible member being formed into a loop;
    roller means in engagement with the loop; and
    means including said roller means to tension the flexible member to offset the wall of the groove into the spiral grooving of the mandrel.

12. A combination as set forth in claim 11, in which said flexible member is a continuous member and said tensioning means includes a second roller means in engagement with the loop.

13. A method as defined in claim 1 wherein said inner groove-forming member includes a spirally grooved mandrel within the tube, said external groove-forming member includes a plurality of rollers arranged longitudinally of the mandrel and positioned exteriorly of the tube at progressively decreasing radial distances from the mandrel for cooperation with the spiral groove on the mandrel, and said step of moving the tube includes rotating the tube to move the tube longitudinally to cause the rollers to progressively form a spiral groove of progressively increasing depth.

14. In a method of fabricating a corrugated hose from a tube having a wall of deformable material, the steps of:
  inserting an inner groove-forming member into the tube;
  providing an elongated flexible member in the form of a closed loop secured to support means;
  forcing said elongated flexible member against the tube to urge a portion of the wall of the tube against said inner groove-forming means to corrugate the tube; and
  substantially continuously moving the tube longitudinally relative to the elongated flexible member to progressively continuously convert the tube into the corrugated hose.

References Cited

UNITED STATES PATENTS

| | | | |
|---|---|---|---|
| 913,720 | 3/1909 | Gammeter | 18—6 |
| 1,280,170 | 10/1918 | Crawford | 18—19 |
| 1,797,193 | 3/1931 | Kimmich. | |
| 1,879,663 | 9/1932 | Dreyer. | |
| 2,430,081 | 11/1947 | Roberts et al. | |
| 2,508,798 | 5/1950 | Polsen et al. | |
| 2,730,762 | 1/1956 | Ballard | 18—13 |
| 2,832,096 | 4/1958 | Kramer et al. | 18—19 X |
| 2,866,230 | 12/1958 | Holte | 18—19 |
| 2,903,744 | 9/1959 | Harrison et al. | 18—19 |
| 3,155,757 | 3/1963 | Kramer et al. | 264—286 |

WILLIAM J. STEPHENSON, *Primary Examiner.*